July 21, 1931.  A. RONNING ET AL  1,815,587

COMBINATION TRACTOR HARVESTER

Original Filed April 29, 1920  4 Sheets-Sheet 1

Inventors.
Adolph Ronning;
Andrean G. Ronning, dec'd,
by Adolph Ronning and Jacob A. Ronning,
Executors.

July 21, 1931.   A. RONNING ET AL   1,815,587
COMBINATION TRACTOR HARVESTER
Original Filed April 29, 1920   4 Sheets-Sheet 3

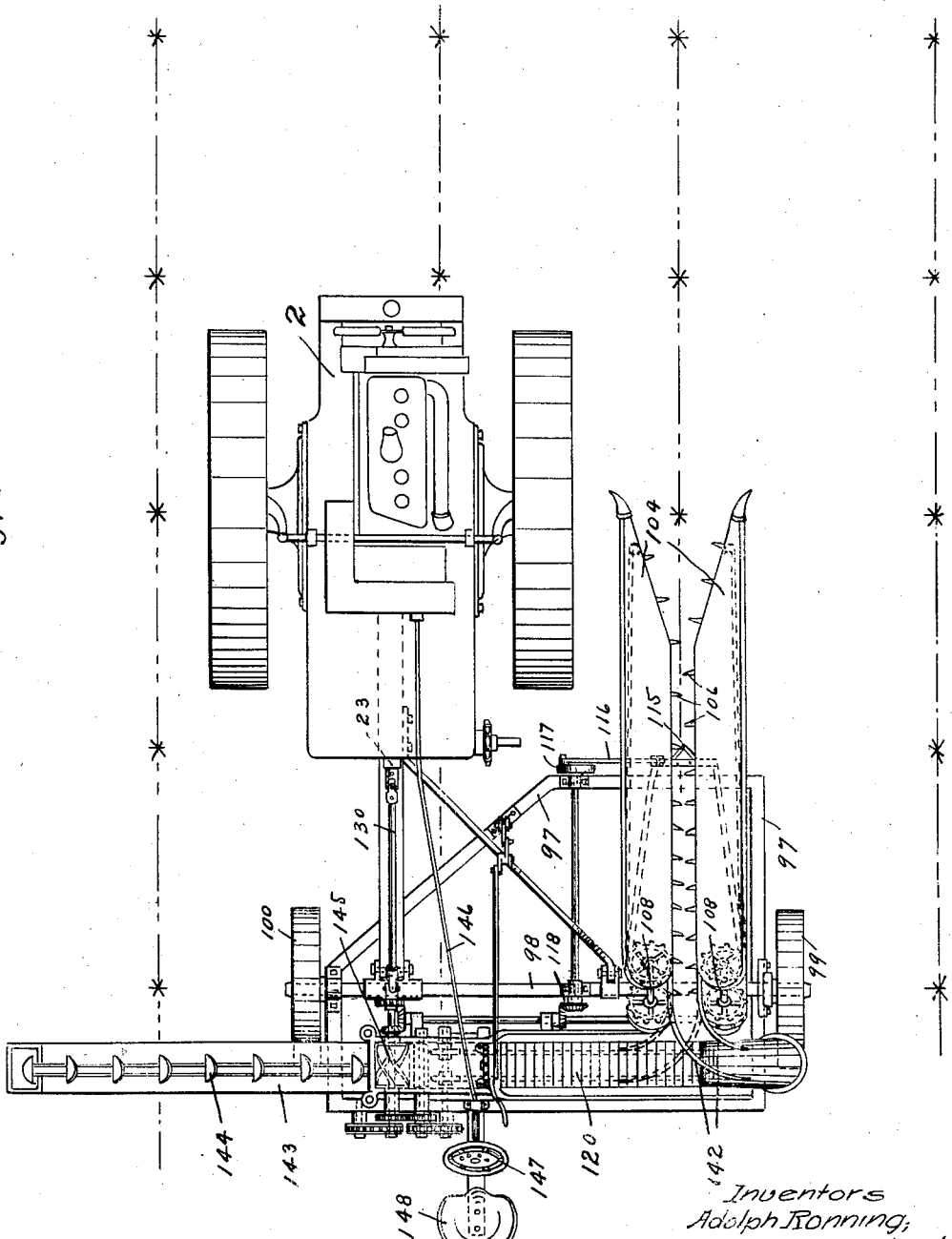

Patented July 21, 1931

1,815,587

UNITED STATES PATENT OFFICE

ADOLPH RONNING, OF MINNEAPOLIS, MINNESOTA, AND ANDREAN G. RONNING, DECEASED, LATE OF MINNEAPOLIS, MINNESOTA, BY ADOLPH RONNING AND JACOB A. RONNING, BOTH OF MINNEAPOLIS, MINNESOTA, EXECUTORS

COMBINATION TRACTOR HARVESTER

Original application filed April 29, 1920, Serial No. 377,564. Divided and this application filed January 28, 1929. Serial No. 335,729.

Figure 5:
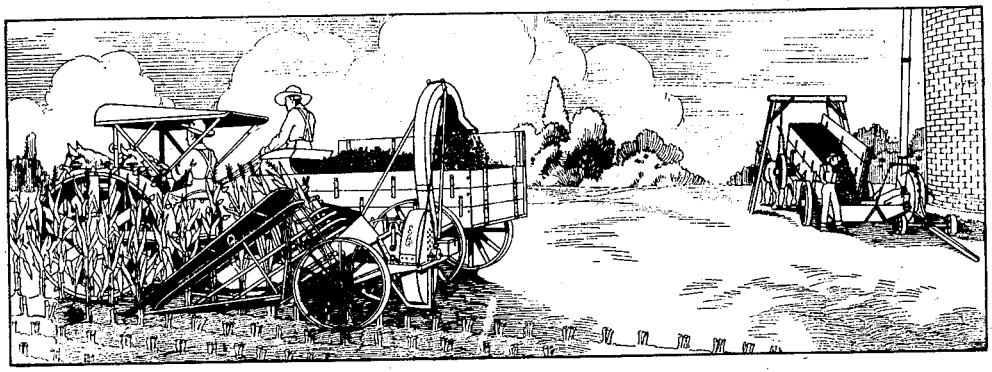
Figure 1:
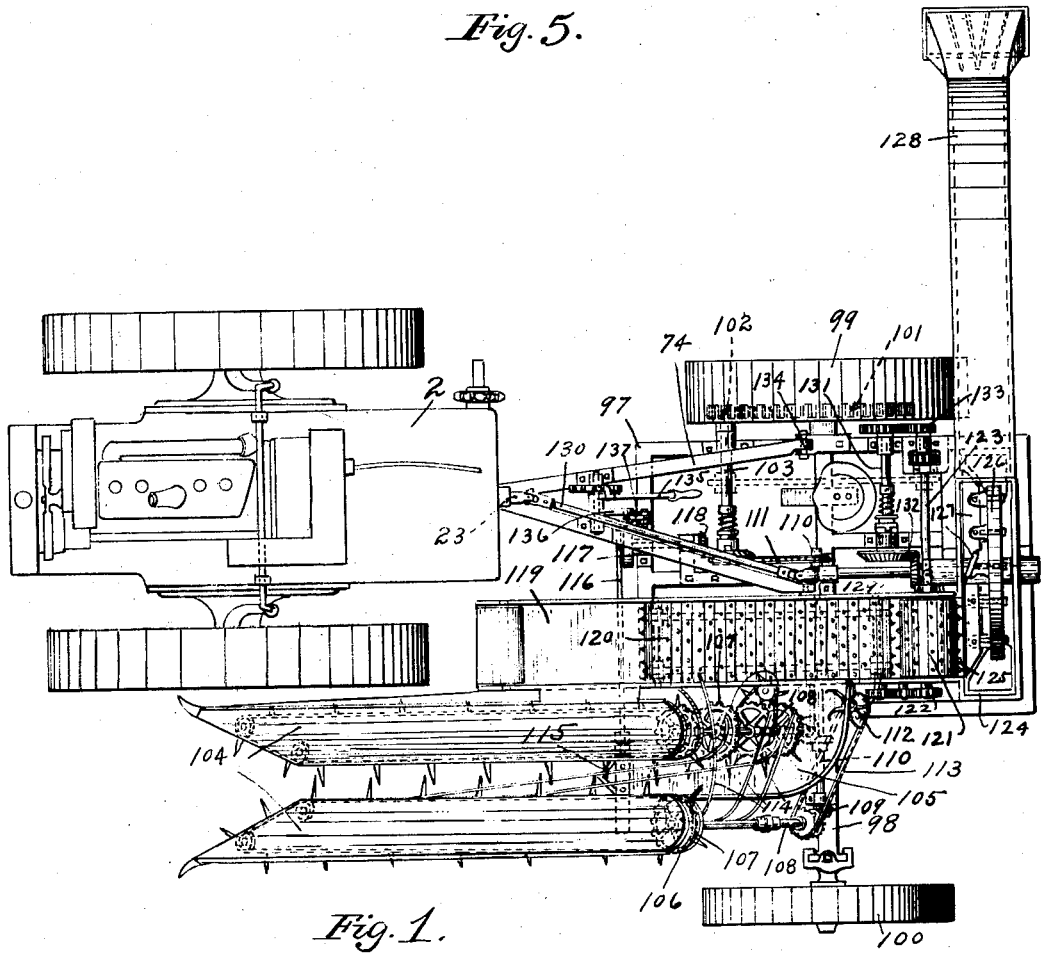
Figure 2:
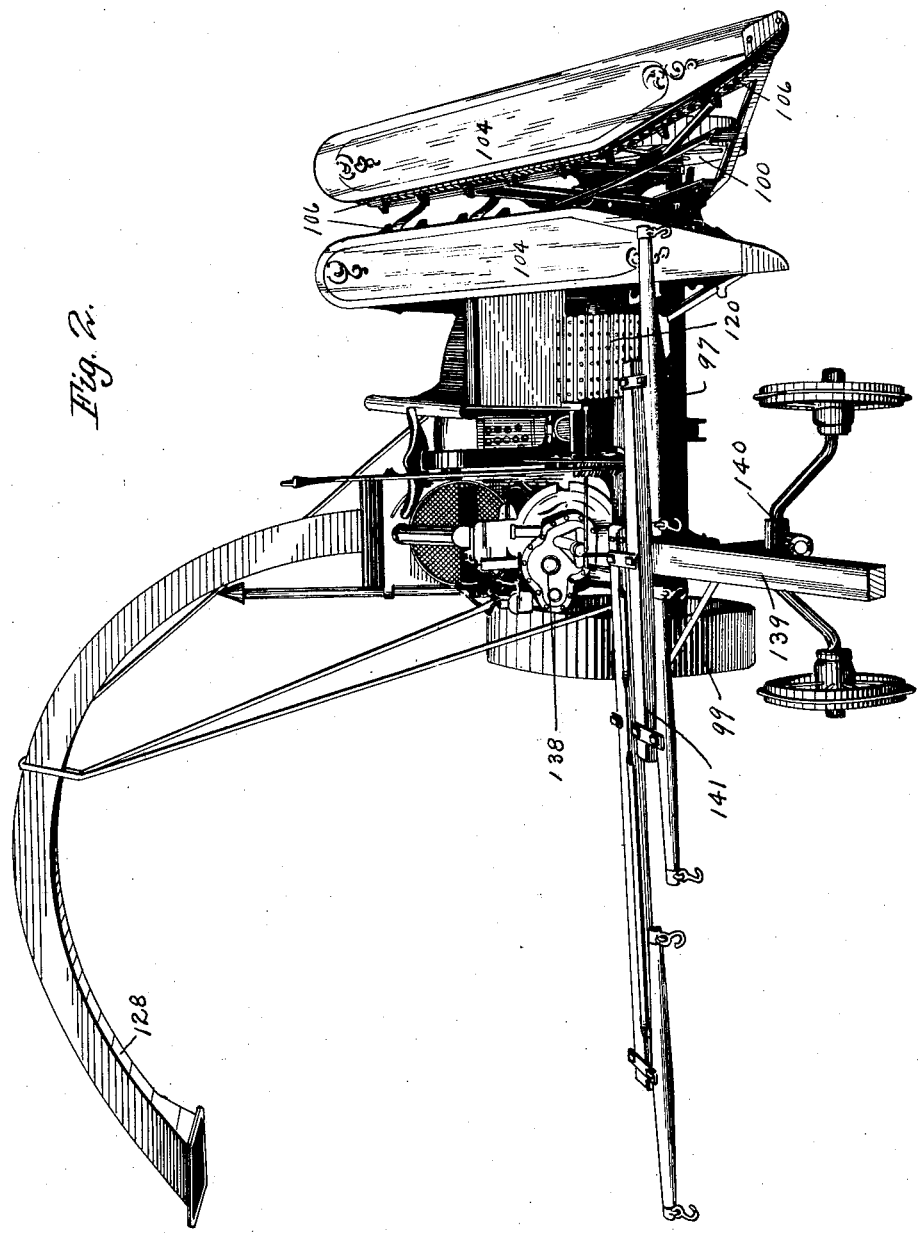
Figure 3:
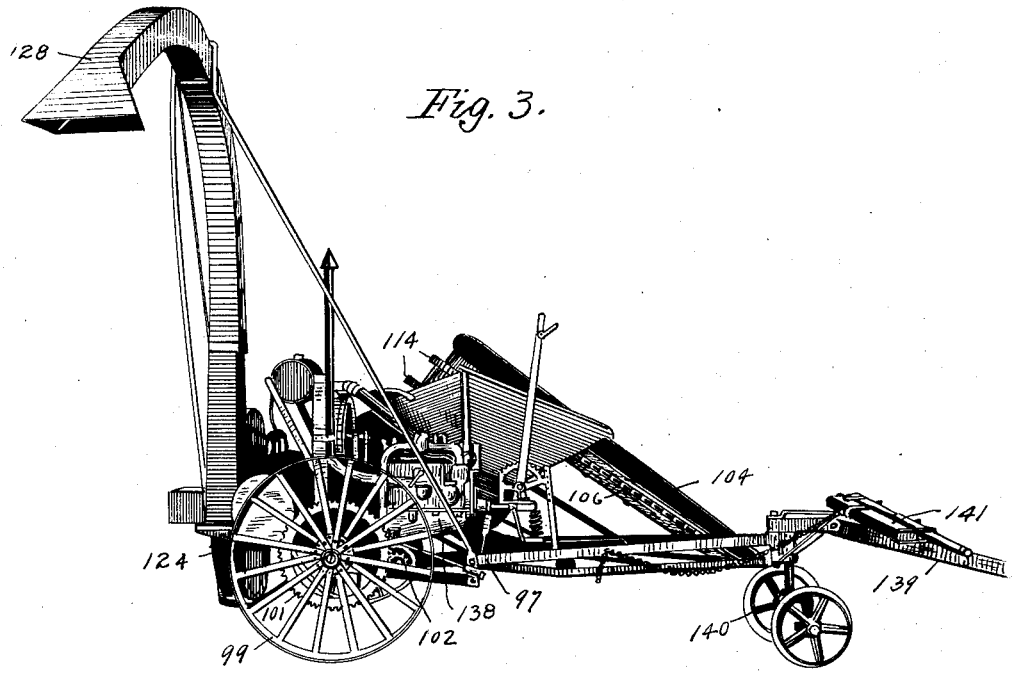
Figure 4:
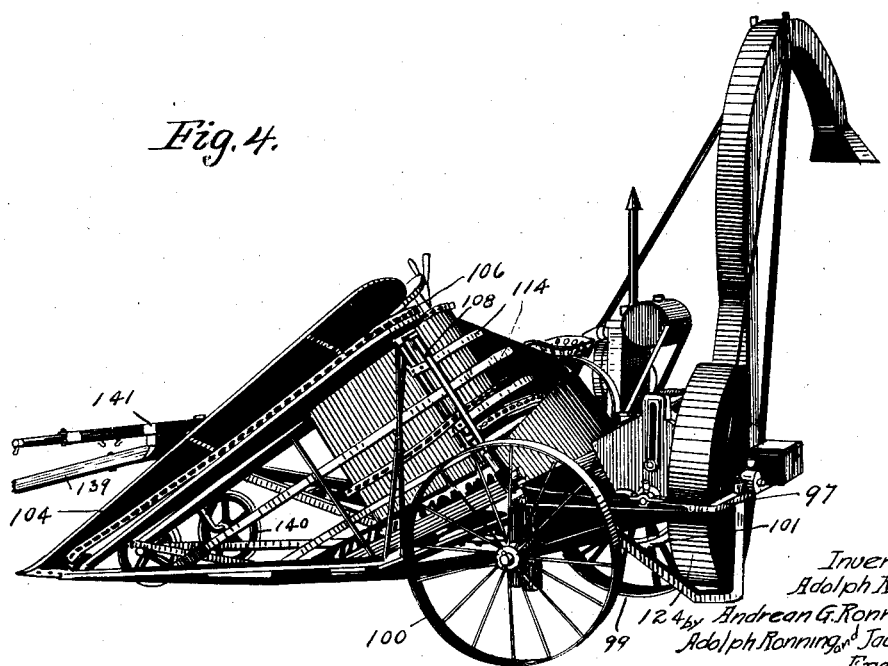

This invention relates to harvesting machinery, and the primary object is to provide a novel, efficient and practical construction of combination tractor and harvester, wherein the harvester is detachably connected to a tractor in an arrangement whereby the tractor is not only employed to draw or propel the harvester, but also actuates the mechanisms thereof by a power take off device which also presents certain novel features. A further object is to so position and connect the harvester with respect to the tractor that it may be steered, controlled and operated in a particularly advantageous manner. Other and more specific objects will be disclosed in the course of the following specification, reference being had to the drawings forming a part of this application, wherein:
Fig. 1 is a plan view of a combination tractor harvester embodying the invention.
Fig. 2 is a perspective front elevation of the harvester unit as shown in Fig. 1, but showing it as provided with its own engine, and with a stabilizing front truck together with tongue and equalizer whereby it may be hitched to and pulled by horses.
Fig. 3 is a perspective side elevation of the machine shown in Fig. 2, as seen from the left.
Fig. 4 is a perspective side elevation of the harvester shown in Fig. 2, as seen from the right.
Fig. 5 is a perspective view showing the ensilage harvester and tractor coupled, as in Fig. 1, and operating to deliver the cut ensilage into a wagon drawn alongside the machine.
Fig. 6 is a plan view of a modified form of harvester.
Referring to the drawings more particularly and by reference characters 2 designates a tractor of the unstable type supported on dirigible traction wheels and having an engine for driving the wheels. As far as the present invention is concerned any type or style of tractor unit may be employed, and therefore it is only designated generally. However, the tractor shown has been fully illustrated and described in detail in a copending application, Ser. No. 377,564, filed April 29, 1920, for Combination tractor implement, and of which this application is a division.

In the harvester structure shown in Figs. 1 and 5, the main frame is indicated as an entirety by the numeral 97 and this frame is supported directly by an axle 98 provided at one end by a traction wheel 99, and at its other end with a loose ground-engaging wheel 100. The traction wheel 99 is provided with an internal gear 101 that meshes with a driving pinion 102 on a transverse shaft 103 journaled in suitable bearings on the frame 97.

The stalks to be cut are gathered between laterally spaced forwardly projecting gathering frames 104 rigidly secured to the main frame 97 and projecting forward from an inclined deck 105, also supported by said frame. Endless toothed gathering chains 106 run over suitable guide sprockets or wheels on the frames 104 and over driving sprockets 107 on oblique shafts 108, which by miter gears 109, are driven from a transverse shaft 110 mounted in suitable bearings on the main frame 97. Shaft 110 is driven from shaft 103 through a suitable sprocket and chain drive 111. The numeral 112 indicates star wheels arranged to co-operate in the delivery of the stalks and are arranged to be driven from the respective shafts 108 through suitable sprocket and chain drives 113. The numeral 114 indicates guide rods or spring arms supported from the outer gathering frame 104.

The numeral 115 indicates a vibratory sickle which operates as a primary cutter to sever the standing stalks from the ground. This sickle 115 is connected by a pitman 116 to a crank disk 117 that is driven from the shaft 103 through a beveled gear drive 118.

The numeral 119 indicates a hopper-like frame rigidly secured to the main frame 97 adjacent to the inner gathering frame 104 and having an open side for the delivery of the stalks thereto from the deck 105. Working within the hopper frame 119 is an endless toothed apron 120 that delivers the cut stalks, butt ends rearward, to feed rollers 121. The belt 120 is driven from one of the rollers

121 through gears 122, the said driving rollers 121 being secured to one end of a shaft 123 journaled in suitable bearings on the main frame.

Secured to the rear portion of the frame 97 is a fan casing 124 that is open at its front side to receive the stalks and is provided with a fixed shearing blade 125. Rotatably mounted within the fan casing 124 is a fan head 126 equipped with ensilage cutting knives 127 that co-operate with the fixed shearing blade 125. The fan casing 124 is provided with a discharge spout 128 that is preferably curved upwardly and extended transversely to one side of the ensilage harvester, so that it will deliver the cut ensilage into a wagon box, or the like, driven at one side of the harvester.

The fan head 126 is secured to a shaft 129 that is connected by a knuckle jointed shaft 130 to the rear end of the power take off shaft 23 of the tractor. The numeral 131 indicates a shaft journaled in bearings on the frame 97 and connected at one end to shaft 129 by beveled gears 132 and connected at its other end to roller shaft 123 by spur gears 133. Thus, it will be seen that the combined fan and ensilage cutter 126—127, the feed rollers 131 and the feed belt 120 are driven from the engine on the tractor, while the primary or stalk cutter 115 and the feed belts or chains 106 and the star wheels 112 are all driven from the traction wheel 99 under advance movement of the machine.

For coupling the ensilage cutter to the tractor 2, the drawbar 74, is pivotally connected to the frame 97 at 134. For raising and lowering the front portion of the ensilage cutter, or in other words, for tilting of the same, an adjustable connection, such as a latch lever 135 provided with an arm 136 and a link 137 between said arm and the front portion of the frame 97, may be employed.

The operation of the mechanism shown in Figs. 2 and 5 is probably obvious, but may be briefly described, as follows:

Under advance movement of the machine, the gathering frames 104 will bring the standing stalks between the gathering chains 106, and by the latter, the stalks will be directed to the sickle or primary cutter 115, and thereby severed from the ground. The cut stalks, by the feed chains, will be carried onto the deck 105, and, by the chains and the guide rods or arms 114, the stalks, as they are delivered into the hopper 119 and onto the feed belt 120, will be turned, butt ends rearward, so that the stalks will be fed between the feed rollers and to the ensilage cutter, butt ends first. The cut ensilage will, by the combined action of centrifugal force and the blowing action of the fan, be thrown out through the delivery spout 128 and deposited in the wagon box, as described.

The ensilage harvester shown in Figs. 2, 3, and 4 is the same ensilage harvester that is illustrated in Figs. 1 and 5, except that it is arranged to be drawn by horses, and its mechanism is driven by an engine carried on the ensilage harvester frame. Those parts that are common with those of the harvester shown in Fig. 1 are indicated by the same numerals. The engine here used is indicated, as an entirety, by the numeral 138. The numeral 139 indicates the pole, which is secured to the frame 97, is supported by a two-wheeled truck 140 and, as shown, is equipped with a draft equalizer 141.

The ensilage harvester illustrated in Fig. 6 is much like that illustrated in Fig. 1, but the arrangement is such that the cut stalks are delivered onto a transversely movable conveyor belt and fed transversely of the machine, butt ends first, to the ensilage cutter, and from thence, to a mechanical belt-equipped elevator.

Parts of this ensilage harvester, (Fig. 6) that are identical with or similar to the corresponding parts of the ensilage harvester of Fig. 1, are indicated by the same numerals, but other parts thereof will be noted, as follows:

At the point where the stalks are delivered from the gathering chains 106 onto the transversely extended feed belt 120, are curved arms 142 that may be set, as shown by full lines in Fig. 6. when it is desired that the stalks be fed, butt ends first, to an ensilage cutter, but which may be set, as shown by dotted lines, when it is desired that the stalks be fed, head ends first to the ensilage cutter. The cut ensilage, from the ensilage cutter, is delivered to a discharge spout 143, through which works an endless bucket-equipped elevator belt 144. The ensilage cutter shown as here employed, is of the rotary cutting wheel type and is indicated by the numeral 145. In this arrangement, the numeral 146 indicates a tube containing electric tractor control wires, the wires being brought back to the control switch 147 located within easy reach of the operator's seat 148. In this manner the harvester operator can control the tractor by an electric mechanism as described in application Ser. No. 377,564.

The invention having now been illustrated and described, what is claimed is:

1. The combination with a tractor, of a harvester arranged behind the tractor, a pair of laterally disposed wheels supporting substantially the entire weight of the harvester, a frame extending rearwardly from the tractor for connection with the harvester, and means, associated with said frame, for vertically adjusting the harvester, said frame being pivotally connected to the harvester by a transversely disposed pivot connection.

2. The combination with a tractor, of a harvester arranged behind the tractor, a pair of laterally disposed wheels supporting the harvester, a frame extending rearwardly from the tractor for transverse pivot connection with the harvester, and a power take off mechanism extending rearwardly from the tractor to the harvester, said mechanism including a longitudinally disposed shaft having universal joints at its ends.

3. The combination with a tractor, of a harvester disposed behind and connected to the tractor so as to be drawn thereby, said harvester having a rotary crop cutter, and means, including a shaft having universal joint connections at its ends, for connecting the rotary cutter to a power shaft of the tractor.

4. The combination with a tractor of the unstable type, of a harvester carried by a pair of laterally disposed ground wheels behind the tractor, a frame connection between the harvester and tractor whereby each will have a supporting action with respect to each other, and a power take off connection, including a longitudinally disposed shaft, for connecting the harvester with the engine of the tractor.

5. The combination with a tractor, of a harvester, having a pair of supporting wheels, to be drawn behind the tractor, said harvester having a rotary cutter disposed rearwardly of the tractor and on an axis in alignment therewith, and a power take off shaft connecting the drive shaft of the tractor engine directly to the cutter.

6. The combination with a tractor, of a harvester, having a pair of supporting wheels, to be drawn behind the tractor, said harvester having a rotary cutter disposed rearwardly of the tractor and on an axis in alignment therewith, and a power take off shaft connecting the drive shaft of the tractor engine directly to the cutter, said power take off shaft having universal joints at its ends to permit angular adjustments to the harvester with respect to the tractor.

7. The combination with a tractor, of a harvester carried by a pair of laterally arranged supporting wheels and adapted to be drawn by the tractor, a draft device between the tractor and harvester, a transverse pivot connection between the harvester and draft device, and means for angularly adjusting the harvester with respect to the draft device on said transverse pivot.

8. The combination with a tractor, of a harvester arranged to be drawn by the tractor, lateral supporting wheels for the harvester, means for tiltably adjusting the harvester on a transverse axis, said harvester having a rotary crop cutter, and a shaft extending from the tractor to the harvester for transmitting power from the tractor engine to said rotary crop cutter.

9. The combination with a tractor, of a harvester arranged to be drawn by the tractor, lateral supporting wheels for the harvester, means for tiltably adjusting the harvester on a transverse axis, said harvester having a rotary crop cutter, and a shaft extending from the tractor to the harvester for transmitting power from the tractor engine to said rotary crop cutter, said adjusting means including a draft member, extending from the tractor and having a pivot connection with the harvester.

10. The combination with a tractor, of a harvester having a crop gathering frame and a rotary cutter for cutting the gathered crop, a pair of wheels for supporting the harvester, a draft frame connecting the harvester to the tractor and means connected with the draft frame for tilting the gathering frame.

11. The combination with a tractor, of a harvester having a crop gathering frame and a rotary cutter for cutting the gathered crop, a pair of wheels for supporting the harvester, a draft frame connecting the harvester to the tractor, means for tiltably adjusting the harvester with respect to the draft frame, and a power shaft for transmitting power from the tractor engine to the said rotary crop cutter.

Signed at Minneapolis, Minnesota, this 24th day of January, 1929.

ADOLPH RONNING,
*Joint Inventor.*
ADOLPH RONNING,
JACOB A. RONNING,
*Joint Executors of the Estate of Andrean G. Ronning, Deceased.*